(12) United States Patent
Ikeda et al.

(10) Patent No.: US 8,878,934 B2
(45) Date of Patent: Nov. 4, 2014

(54) IMAGE DISPLAY DEVICE (75) Inventors: Keigo Ikeda, Anjo (JP); Noboru Nagamine, Anjo (JP); Tomoyuki Matsuba, Anjo (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/581,509

(22) PCT Filed: Dec. 21, 2010

(86) PCT No.: PCT/JP2010/072975
§ 371 (c)(1),
(2), (4) Date: Aug. 28, 2012

(87) PCT Pub. No.: WO2011/114597
PCT Pub. Date: Sep. 22, 2011

(65) Prior Publication Data
US 2012/0320213 A1 Dec. 20, 2012

(30) Foreign Application Priority Data

Mar. 18, 2010 (JP) ................. 2010-062856

(51) Int. Cl.
*H04N 7/16* (2011.01)
*B62D 15/02* (2006.01)
*B60R 1/00* (2006.01)
*H04N 7/18* (2006.01)

(52) U.S. Cl.
CPC ............ *B60R 1/00* (2013.01); *B60R 2300/105* (2013.01); *B60R 2300/305* (2013.01); *B60R 2300/307* (2013.01); *B60R 2300/806* (2013.01); *B60R 2300/607* (2013.01); *B62D 15/028* (2013.01); *H04N 7/18* (2013.01)
USPC ........................................................ 348/148

(58) Field of Classification Search
CPC .................................................. B60R 2300/305
See application file for complete search history.

(56) References Cited

U.S. PATENT DOCUMENTS 5,646,614 A * 7/1997 Abersfelder et al. ...... 340/932.2
7,136,754 B2 11/2006 Hahn et al.
(Continued)

FOREIGN PATENT DOCUMENTS

CN 1371079 A 9/2002
CN 1461561 A 12/2003
(Continued)

OTHER PUBLICATIONS

Chinese Office Action, dated Mar. 26, 2013, issued in corresponding Chinese Application No. 201080065413.8.
(Continued)

*Primary Examiner* — Anner Holder
*Assistant Examiner* — Mikhail Itskovich
(74) *Attorney, Agent, or Firm* — Sughrue Mion, PLLC (57) ABSTRACT

Disclosed is an image display device that allows intuitive guidance of a vehicle body based on an assisting image displaced in a screen. The image display device includes an image processing section for displaying a captured image of a rear camera on a monitor. This image processing section includes a synthesis processing unit for displaying a perspective image providing a perspective in superposition over the captured image being displayed on the monitor and a display mode setting unit that realizes selection between a viewing field-fixed mode for displaying the perspective image in superposition with the perspective image being fixed within a viewing field of the monitor and a road surface-fixed mode for displaying the perspective image in superposition with allowing scrolling thereof in unison with a road surface.

8 Claims, 9 Drawing Sheets

(56) References Cited

U.S. PATENT DOCUMENTS

| | | |
|---|---|---|
| 7,145,519 B2 | 12/2006 | Takahashi et al. |
| 2002/0110262 A1 | 8/2002 | Iida et al. |
| 2002/0175999 A1 | 11/2002 | Mutobe et al. |
| 2003/0197660 A1 | 10/2003 | Takahashi et al. |
| 2007/0263901 A1* | 11/2007 | Wu et al. ............ 382/104 |
| 2008/0077882 A1* | 3/2008 | Kramer et al. ........ 715/810 |
| 2009/0079828 A1* | 3/2009 | Lee et al. ............ 348/148 |
| 2009/0237269 A1 | 9/2009 | Okugi et al. |

FOREIGN PATENT DOCUMENTS

| | | |
|---|---|---|
| EP | 1 231 110 A2 | 8/2002 |
| EP | 2 103 485 A2 | 9/2009 |
| JP | 8-50699 A | 2/1996 |
| JP | 2003-102002 A | 4/2003 |
| JP | 2003-348574 A | 12/2003 |
| JP | 2009-226978 A | 10/2009 |

OTHER PUBLICATIONS

English Translation of International Preliminary Report on Patentability for PCT/JP2010/072975 dated Nov. 1, 2012.

International Search Report for PCT/JP2010/072975 dated Apr. 5, 2011.

Extended European Search Report issued in European Application No. 10848003.9 dated Jun. 11, 2013.

* cited by examiner

Fig.7 reversing

IMAGE DISPLAY DEVICE

CROSS REFERENCE TO RELATED APPLICATIONS

This application is a National Stage of International Application No. PCT/JP2010/072975 filed Dec. 21, 2010, claiming priority based on Japanese Patent Application No. 2010-062856 filed Mar. 18, 2010, the contents of all of which are incorporated herein by reference in their entirety.

TECHNICAL FIELD

The present invention relates to an image display device, more particularly to an image display device configured such that a camera mounted on a self-propelled vehicle of e.g. an automobile is used for capturing an image of the surrounding of the vehicle body and the image thus captured is displayed on a monitor disposed adjacent a driver's seat for assisting driving operation.

BACKGROUND ART

As an example of the image display device configured as above, Patent Document 1 discloses a device configured such that a monitor is caused to display a lattice-like, grid image providing a perspective in superposition over an actual image captured by a camera so as to allow monitoring of an area of viewing field that extends forwardly and to the left and right as being viewed from the driver.

This Patent Document 1 discloses an arrangement for setting the grid image at such a height not to be overlapped with the image of any important object which may be present on the road, such as a moving body, a traffic sign, etc. The document discloses also that upon detection of a moving object from within the actual image, the position, the moving speed, etc. of this moving body are acquired and information such as an arrow or the like is displayed on the monitor. The document further describes that a grid corresponding to the area where another vehicle is present is displayed with a more conspicuous color or when the outside of the vehicle is dark such as in the evening or at nighttime, white color is set while restraining the brightness of the grid.

PRIOR ART DOCUMENT

Patent Document

Patent Document 1: Japanese Unexamined Patent Application Publication No. 2009-226978

SUMMARY OF THE INVENTION

Object to be Achieved by Invention

The grid described in Patent Document 1 is displayed at a fixed position on the monitor, so that when the vehicle body is stopped, the distance to a point of crossing, a pedestrian crossing, etc. can be judged based on the grid. That is, the distance can be measured with using the grid like a measuring instrument.

However, with the above arrangement that displays a grid, a change in the traveling direction of the self vehicle results in displacement of the grid relative to the actual image. Hence, in association with a steering operation, the grid will be displaced to the left or right relative to the background (actual image) captured by the camera, thus making it difficult to grasp the positional relationship between the grid and the background. Especially, it was conceived that the relationship between the background and the grid will give a feeling of unnaturalness in case the steering operation involves acceleration or deceleration.

The grid displayed on the screen is useful for grasping of the positional relationship between the self vehicle and a parking position, an obstacle or the like. Yet, for grasping of the position of the self vehicle from the grid, this requires that the self vehicle be stopped or caused to travel at a low speed. In particular, in the case of Patent Document 1, attention is called for by changing the color of the grid where another vehicle is present to a more conspicuous color. However, it was believed that as the area of this conspicuous color is displaced on the grid in association with a movement of the self vehicle, the mode of displaying will give feeling of unnaturalness.

On the other hand, it is also desired to take advantage of the usefulness of displaying in the screen an assisting image such as a white line painted on the road surface for identifying a parking position or a grid for clarifying the distance to or the positional relationship relative to e.g. an obstacle present on the road surface. Then, it is desired that this assisting image such as a grid be displayed in such a form that allows unerring recognition by the driver of the distance between obstacle on the road surface or the like and the vehicle body.

The object of the present invention is to configure rationally an image display device for displaying not only a captured image on a monitor, but also an assisting image in superposition over the captured image for facilitating recognition of the position of the vehicle body relative to an obstacle or the like.

Means for Achieving Object

According to the characterizing feature of the present invention, there are provided a camera mounted on a vehicle body for capturing an image of the surrounding of the vehicle body; and an image processing section for causing the captured image of the camera to be displayed on a monitor mounted on the vehicle body, generating a perspective image which reflects the perspective of the captured image of the camera and executing a processing in a road surface-fixed mode wherein the perspective image is scrolled as being fixed relative to the road surface in association with a movement of the vehicle body and this scrolled perspective image is displayed in superposition over the captured image on the monitor.

With the above arrangement, the monitor displays a captured image of the camera and displays also, in superposition over this, a perspective image in the road surface-fixed mode, with the perspective image being moved (scrolled) in unison with the road surface in the captured image being moved on the monitor. With such displaying, even when the vehicle body is moved with involving a steering operation thereof, there will not occur any change in the relative positional relationship between the road surface and the perspective image or any unnaturalness in the sense of perspective image, and grasping of the amount and/or speed of the movement even in the case of a movement on a road surface having no shading is facilitated as well.

Therefore, there has been provided an image display device for displaying not only a captured image on a monitor, but also an assisting image in superposition over the captured image for facilitating recognition of the position of the vehicle body relative to an obstacle or the like.

According to one possible variation of the present invention, there is set a processing in a viewing field-fixed mode for displaying on the monitor the perspective image in superposition with the perspective image being fixed within a displaying area of the monitor and the image processing section selectively effects one of the road surface-fixed mode and the viewing field-fixed mode.

With the above arrangement, if processing is effected in the viewing field-fixed mode, the perspective image will be displayed in superposition over the captured image, with the perspective image being fixed within the displaying area of the monitor. This arrangement allows also easy grasping of the distance from the vehicle body to e.g. a white line or an obstacle on the road surface from the perspective image, when the vehicle body is stopped. The arrangement provides also the possibility of measuring the distance to a target included in the captured image, from the perspective image, during traveling.

According to another possible variation of the present invention, there is provided a selection button for selecting, with an operation, one of the processing in the road surface-fixed mode and the processing in the viewing field-fixed mode.

With the above arrangement, with an operation of the selection button, selection is made possible between the processing in the road surface-fixed mode and the processing in the viewing field-fixed mode. And, with such selection, it becomes possible to select the viewing field-fixed mode when e.g. it is desired to grasp the distance from the vehicle body position under the vehicle stopped state and the obstacle or the like or to select the road surface-fixed mode when it is desired to grasp any change in the relative distance relative to the obstacle or the like during traveling of the vehicle body. Hence, the selection of displaying mode according to the need is made possible.

According to another possible variation of the present invention, there is provided a conversion processing unit for generating a plane measure image including a partitioning image which partitions a virtual plane corresponding to the road surface in the horizontal direction and the vertical direction by a predetermined interval and converting this plane measure image into the perspective image that reflects the perceived perspective of the captured image of the camera.

With the above arrangement, based on a plane measure image including a partitioning image, the perspective image is generated. And, the partitioning image of the perspective image has the function as a measure using the vehicle body as its reference. And, from this partitioning image, it is possible to grasp the feeling of distance relative to a white line, a target or the like included in the captured image.

According to still another possible variation of the present invention, there is provided an obstacle sensor unit mounted on the vehicle body for detecting the position of a ground object on the road surface. And, there is also provided an area designating unit for changing the mode of displaying of the area where the ground object is present in the perspective image to a mode different from that of an area where no ground object is detected, in case a ground object is detected by the obstacle sensor unit in the road surface-fixed mode.

With the above arrangement, when a ground object is detected by the obstacle detection sensor, the displaying mode of the area in the perspective image where the ground object is present is changed to a different displaying mode from that for the area where no ground object is detected, so that from this displaying, the presence of the ground object can be grasped. Moreover, since the perspective image is displayed in the road surface-fixed mode, when the vehicle body is moved, the area showing the position of the ground object will be moved in unison with the movement of the captured image being displayed on the monitor, whereby the grasping of the position of the ground object is facilitated.

According to still another possible variation of the present invention, the image processing section is configured to display the perspective image on the monitor only at nighttime.

With the above arrangement, even when the road surface is under a dark condition at nighttime and the visual recognition of the perspective image is made difficult thereby, the visibility can be improved.

According to still another possible variation of the present invention, the image processing section sets higher transparency for the perspective image at the time of moving of the vehicle body than at the time of stopped state of the vehicle body.

With the above arrangement, at the time of stopped state of the vehicle body, the arrangement allows grasping of the positional relationship between the road surface and the vehicle body from the perspective image. Whereas, at the time of moving of the vehicle body, the visibility of the perspective image is lowered so as not to interfere with the visual grasping of the captured image being displayed on the monitor.

According to still another possible variation of the present invention, the image processing section sets higher brightness for the perspective image at nighttime as compared with daytime.

With the above arrangement, even in a situation when the checking of the rear side is difficult from the driver's position such as in the case of reversing of the vehicle body at nighttime, since the perspective image displayed on the monitor is displayed with high brightness, it is possible to readily grasp the movement amount or steering amount of the vehicle body, etc. from the perspective image.

According to still another possible variation of the present invention, the image processing section progressively lowers the visibility for an area in the perspective image which area is farther from the vehicle body.

With the above arrangement, in the perspective image, an area farther from the vehicle body is lowered in its visibility. So that, the perspective image adjacent the vehicle body is made clearer relative thereto. Hence, the grasping of the relative distance from e.g. an obstacle present adjacent the vehicle body is made easier. And, also, the perspective image of the far position will not hinder the visibility, either.

MODE OF EMBODYING THE INVENTION

Modes of embodying the invention will be described with reference to the drawings.

In the instant mode of embodiment, there will be explained a control mode and control arrangement of an image display device configured to display a captured image of a rear camera 28 mounted at a rear end of a vehicle body 1 on a monitor 21 when the vehicle body 1 is to be reversed and to display also a perspective image Mp for facilitating grasping of the positional relationship between the vehicle body 1 and a white line or an obstacle or the like present on the road surface in superposition over the captured image.

[Basic Arrangement]

Figure 1:
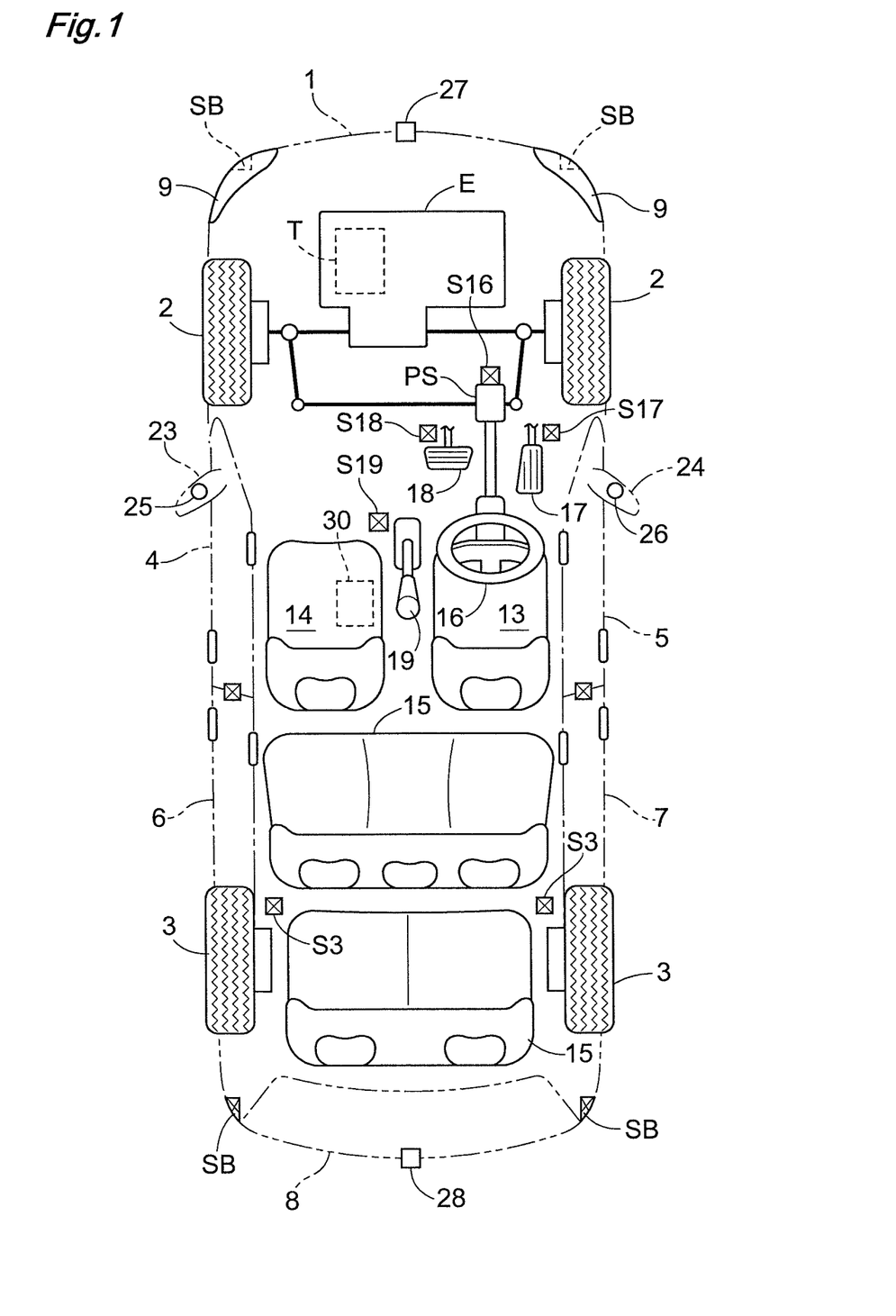
FIG. 1 is a plane view showing a general construction of a passenger vehicle.
Figure 2:
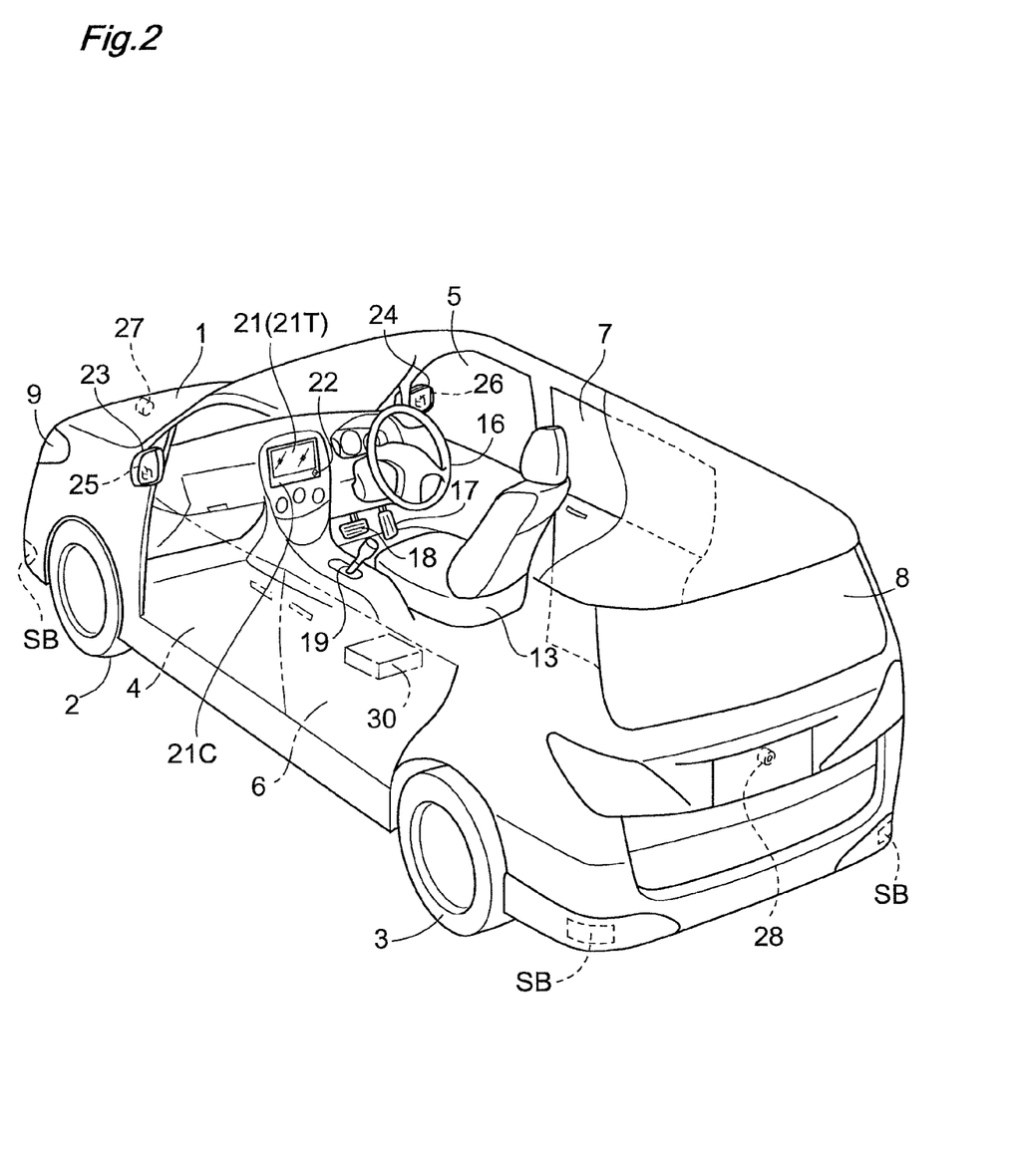
FIG. 2 is a partially cutaway perspective view of the passenger vehicle.

As shown in FIG. 1 and FIG. 2, the vehicle body 1 of a passenger car includes left and right front wheels 2 and left and right rear wheels 3. At front positions of the vehicle body 1, there are mounted a left front door 4 and a right front door 5 which can be opened/closed via hinges; and at rear positions of the vehicle body 1, there are mounted a left rear door 6 and a right rear door 7 that can be slidably opened/closed. Further, at the rear end of the vehicle body 1, there is provided a hatchback type back door 8 and at the front end of the vehicle body 1, there are mounted headlights 9 (front lamps).

Inside the interior of the vehicle body 1, there are mounted a driver's seat 13, a passenger's seat 14 and a plurality of rear sheets 15. At a position forwardly of the driver's seat 13, there is mounted a steering wheel 16, forwardly of which there is disposed an instrument panel including various meters. At the foot area of the driver's seat 13, there are disposed an accelerator pedal 17 and a brake pedal 18. And, at a position laterally of the driver's seat 13, there is mounted a shift lever 19 for realizing speed changing operations.

Adjacent the driver's seat 13 and at an upper position on the instrument console, there is mounted a monitor 21 forming a touch panel 21T on the displaying face thereof. This monitor 21 is of the liquid crystal type monitor having backlight. Needless to say, the monitor 21 can also be a plasma display type or the CRT type. The touch panel 21T will be configured as the pressure-sensitive or electrostatic instruction inputting device configured to output a position touched by a finger or the like as location data. The monitor 21 includes a speaker 22 also in its case 21C. However, this speaker 22 can be mounted at any other position such as the inner side of a door, etc.

The left front door 4 mounts a left side view mirror 23 and the right front door 5 mounts a right side view mirror 24. The left side view mirror 23 mounts a left side camera 25 and the right side view mirror 24 mounts a right side camera 26. And, at the front end of the vehicle body 1, a front camera 27 is mounted and at the rear end of the vehicle body 1, a rear camera 28 is mounted.

In particular, the left side camera 25 and the right side camera 26 each has its image capturing direction set downwards so as to capture an image of a portion of the vehicle body 1 and the road surface together within its image capturing range. The front camera 27 and the rear camera 28 each has its image capturing direction set obliquely downwards so as to capture an image of a portion of the vehicle body 1 and the road surface together within its image capturing range.

These cameras as image capturing devices comprise digital cameras incorporating image pickup devices such as CCD (charge coupled devices) and CIS (CMOS image sensors). Each camera outputs captured information as video information in realtime. Each one of these cameras has a wide angle lens for securing a wide viewing angle.

The monitor 21 is used for displaying navigation information in a control of navigation mode. However, when the shift lever 19 is operated to a reverse (revere traveling) position, a captured image of the rear camera 28 is displayed thereon. Further, in the instant embodiment, there is also displayed in superposition a perspective image Mp as an assisting image indicating the sense of distance to the road surface relative to the captured image of the rear camera 28 displayed on the monitor 21. The processing mode of this displaying will be detailed later. In particular, the captured image of the rear camera 28 is mirror-reversed in the right/left direction so that it can be viewed with a feel similar to that of viewing the rear side via a rear view room mirror.

At a front position of the vehicle body, there is mounted a power steering unit PS for effecting driven steering by transmitting a rotational operation force of the steering wheel 16 to the front wheels 2. Further, at front positions of the vehicle body 1, there are mounted an engine E and a speed changing mechanism T comprised of a torque converter, a CTV, etc. for speed-changing and transmitting the power from the engine E to the front wheels 2. The speed changing mechanism T effects forward/reverse switchover and speed changing operations of the traveling speed in response to operations of the shift lever 19.

The vehicle body 1 mounts various kinds of sensors for detecting a driving operation, a moving condition of the vehicle body 1. Referring more particularly, the operational system for the steering wheel 16 incorporates a steering sensor S16 for determining a steering operation direction (steering direction) and operation amount (steering amount). The operational system for the shift lever 19 incorporates a shift position sensor S19 for determining the shift position. The operational system for the accelerator pedal 17 incorporates an accelerator sensor S17 for determining an operational amount. The operational system for the brake pedal 18 incorporates a brake sensor S18 for detecting occurrence/non-occurrence of operation.

Adjacent each rear wheel 3, there is provided a moving distance sensor S3 of a photo interrupter type or a pickup type for determining a movement amount of the vehicle body 1 from the rotational amount of the rear wheel 3. Incidentally, as the moving distance sensor S3, it is alternatively possible to employ one configured to acquire the movement amount from the rotational amount of the transmission line incorporated within the speed changing mechanism T. The moving distance sensor S3 may be one configured to determine the rotational amount of the front wheel 2. Further alternatively, it is possible to detect the movement amount of the vehicle body 1 and the steering amount through image processing of the captured image of the front camera 27 or the rear camera 28.

Figure 7:
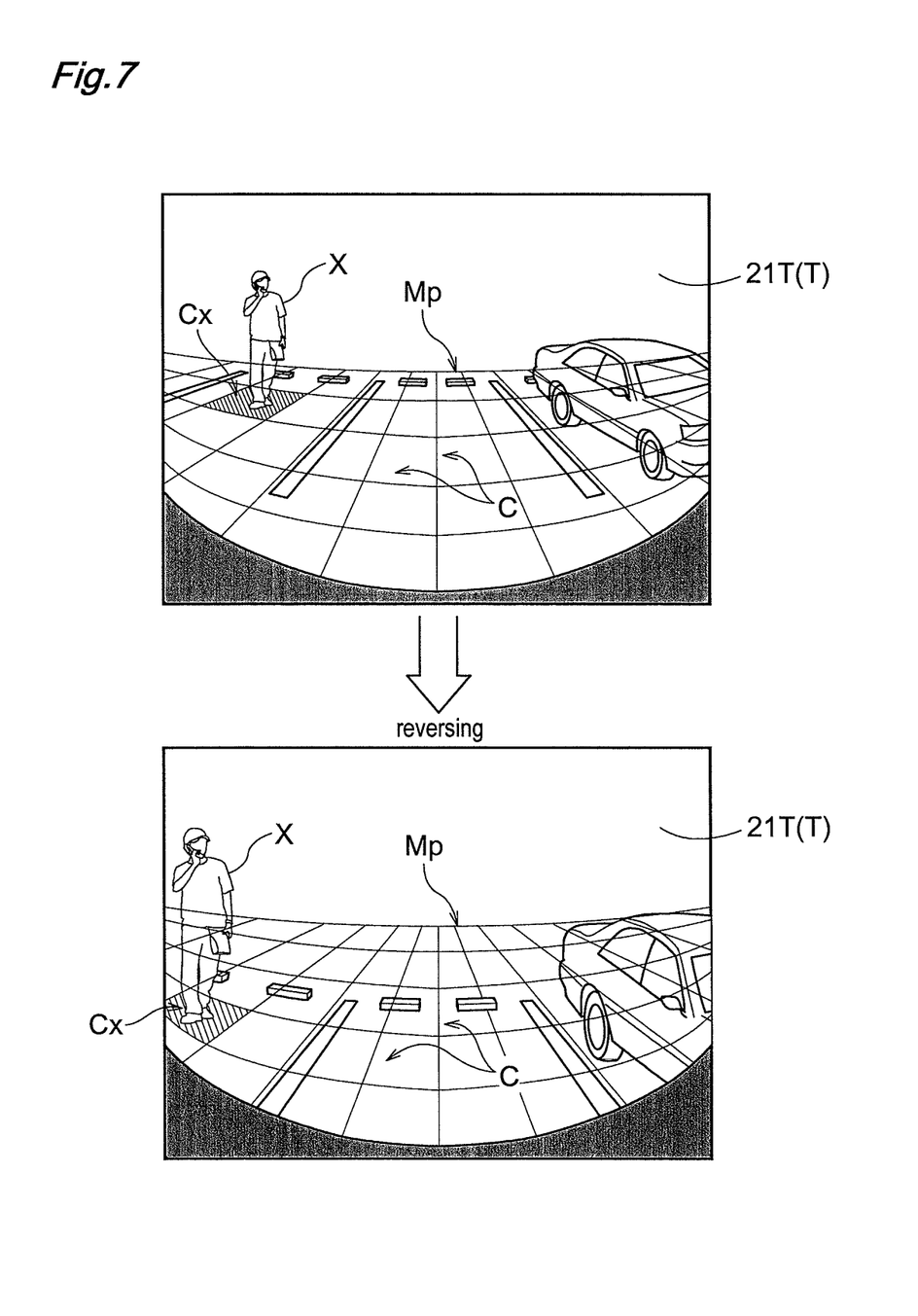
FIG. 7 is a view showing a perspective image displayed in a road surface-fixed mode.

At a plurality of positions of the vehicle body 1, there are mounted obstacle sensor units SB of the supersonic type or the laser beam type for detecting a ground object X (see FIG. 7) such as a human or an obstacle which is present nearby the vehicle body 1 and then outputting position information of such ground object X. This obstacle sensor unit SB may be configured to detect the ground object X from a difference (inter-frame difference) among a plurality of captured images of the camera or to detect the ground object X from the background of a plurality of captured images.

[Control Configuration]

Figure 3:
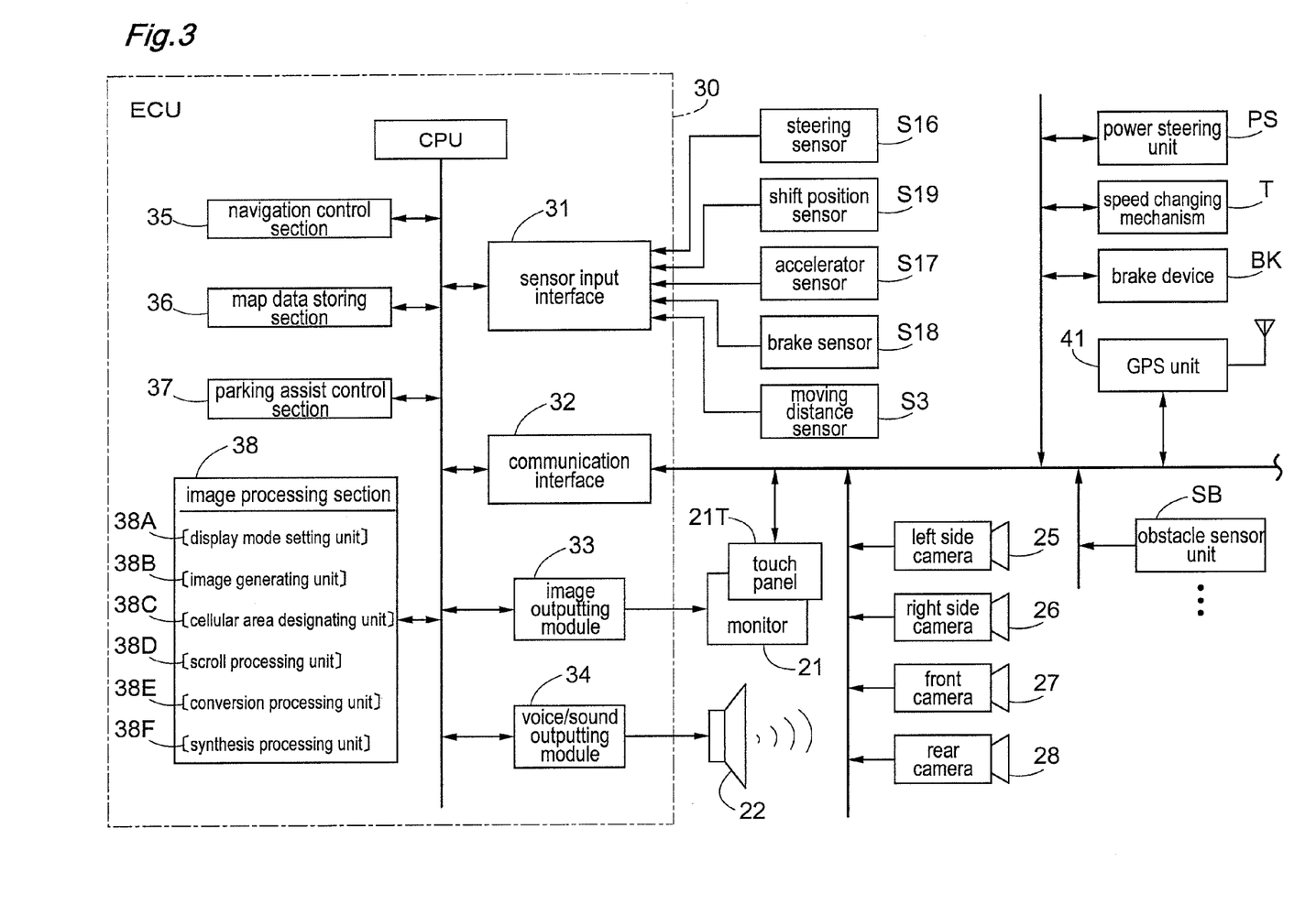
FIG. 3 is a circuit block diagram of a control system.
Figure 4:
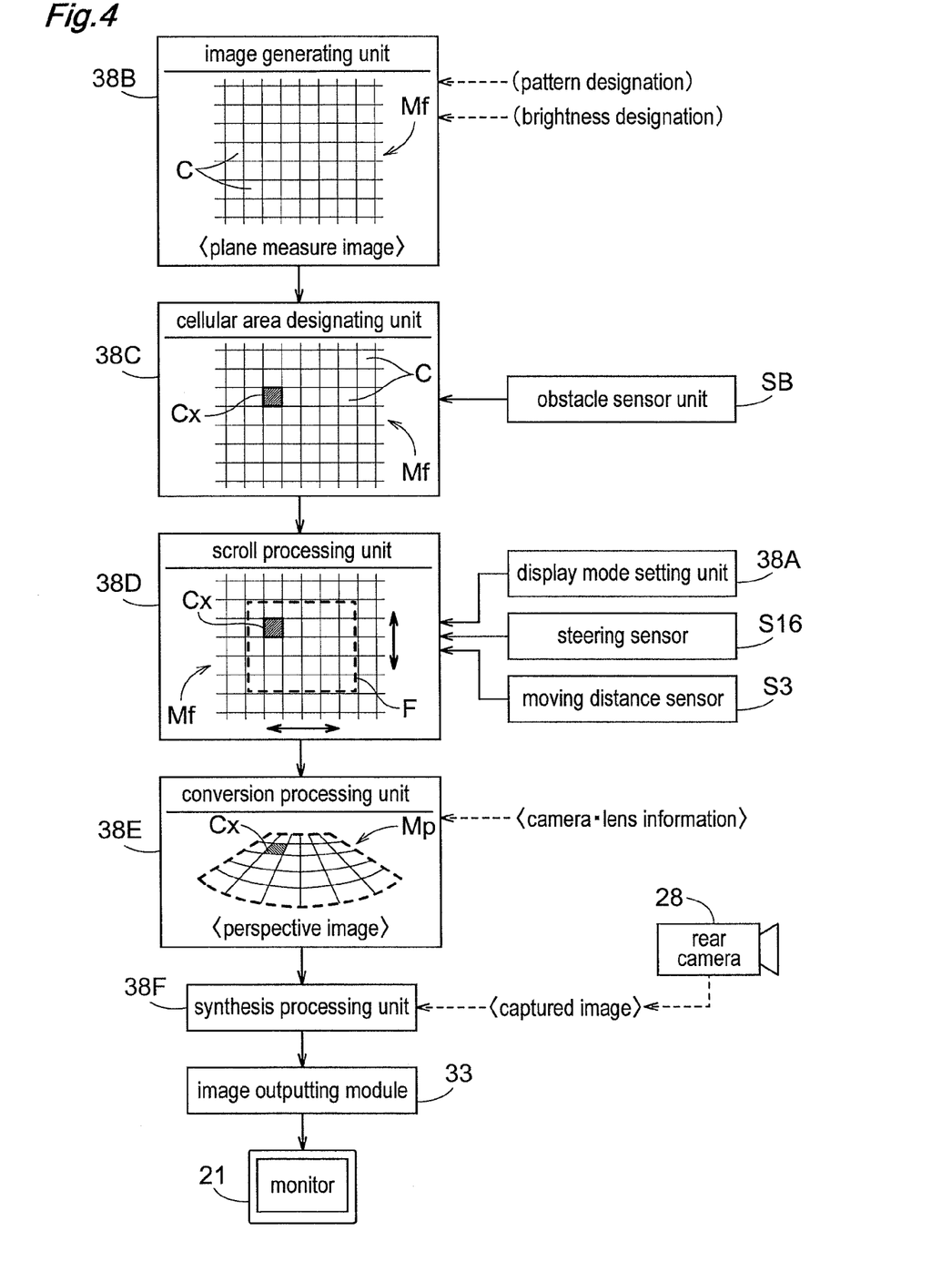
FIG. 4 is a block diagram illustrating the flow of information in a display processing.

At the center of the vehicle body 1, there is mounted an ECU 30 as an image display device of the present invention. This ECU 30, as shown in FIG. 3 and FIG. 4, includes an interface consisting of a sensor input interface 31 and a communication interface 32, and includes also an image output module 33 and a sound/voice output module 34.

This ECU 30 includes a processing system including a microprocessor, a DSP (digital signal processor), etc. for processing information obtained through the interface and the result of processing is outputted through the image output module 33 to the monitor 21 and voice/sound information is outputted through the sound/voice output module 34 to the speaker 22.

This ECU 30 includes a navigation control section 35 for realizing control in the navigation mode, a map data storage section 36 for providing map information to the navigation control section 35, a parking assist control section 37 for realizing control in the parking assist mode and an image processing section 38 for realizing a rear displaying processing.

The navigation control section 35 obtains a self vehicle position represented by longitude information and latitude information from a GPS unit 41 during traveling and then obtains map data corresponding to this self vehicle position and causes the monitor 21 to display the data. The navigation control section 35 also causes the monitor 21 to display navigation information for guiding to a desired destination and causes the speaker 22 to output the navigation information in the form of a sound/voice message. The map data storage section 36 executes an operation of providing the map data corresponding to the self vehicle position to the navigation control section 35.

The parking assist control section 37 causes the monitor 21 to display a captured image in at least one of a camera view mode and an around view mode and to display also in a superposed manner the guide information for guiding the vehicle body 1 to a desired parking position, relative to this captured image, when a parking operation is to be effected. Further, as the assist information, assist information of a steering direction or the like is outputted in the form of a sound/voice from the speaker 22. As a steering operation or the like is effected based on such information as above, the vehicle body 1 can be readily guided or introduced to the parking position.

That is, in the camera view mode, when a parking operation is to be effected, the captured image of the rear camera 28 or the front camera 27 is displayed on the monitor 21 and also upon designation of a parking position in the captured image, assist information in the form of an image or the like of the traveling direction of the vehicle body 1 will be displayed relative to the captured image and assist information in the form of voice/sound for guiding the vehicle body 1 to the parking position will be outputted from the speaker 22.

Further, in the around view mode, from the captured images of the left side camera 25, the right side camera 26, the front camera 27 and the rear camera 28, an image showing the road surface as being viewed from the above will be generated. Then, by mapping this image around the icon of the vehicle body, there is generated a bird's eye view showing the vehicle body 1 as seen from the above and this is displayed on the monitor 21. Further, when needed, assist information in the form of voice/sound for guiding the vehicle body 1 to the parking position will be outputted via the speaker 22.

The image processing section 38 includes a display mode setting unit 38A, an image generating unit 28B, a cellular area designating unit 38C (an example of "area designating unit"), a scroll processing unit 38D, a conversion processing unit 38E and a synthesis processing unit 38F.

Figure 6:
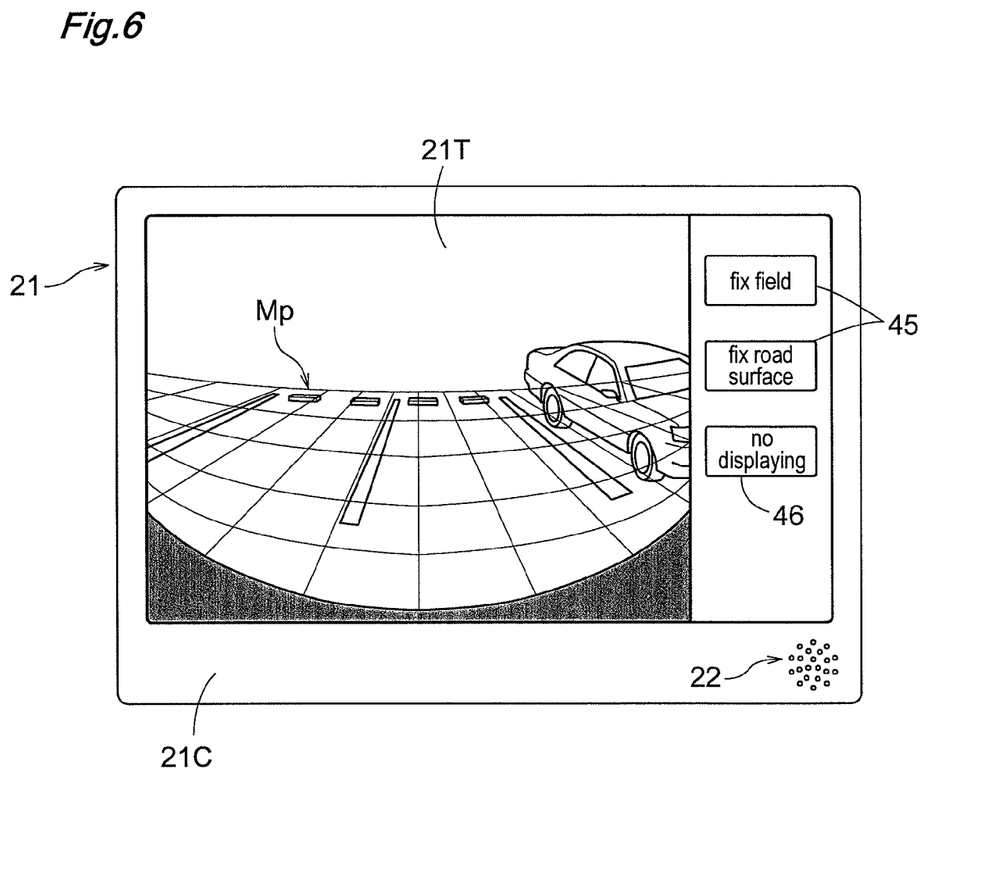
FIG. 6 is a view showing a monitor displayed in the rear display processing.

The display mode setting unit 38A sets one of a processing in a road surface-fixed mode and a processing in a viewing field-fixed mode. More particularly, in the processing in the road surface-fixed mode, the perspective image Mp will be scrolled as being fixed to the road surface in association with movement of the vehicle body 1 and this scrolled perspective image Mp will be displayed on the monitor 21 in superposition over the captured image. Further, in the processing in the viewing field-fixed mode, the perspective image Mp will be displayed on the monitor 21 in superposition over the captured image, with the perspective image Mp being fixed in a displaying area on the monitor 21. This display mode setting unit 38A, as shown in FIG. 6, displays, on the monitor 21, a selection button 45 which realizes selection of one of the two modes.

Figure 8:
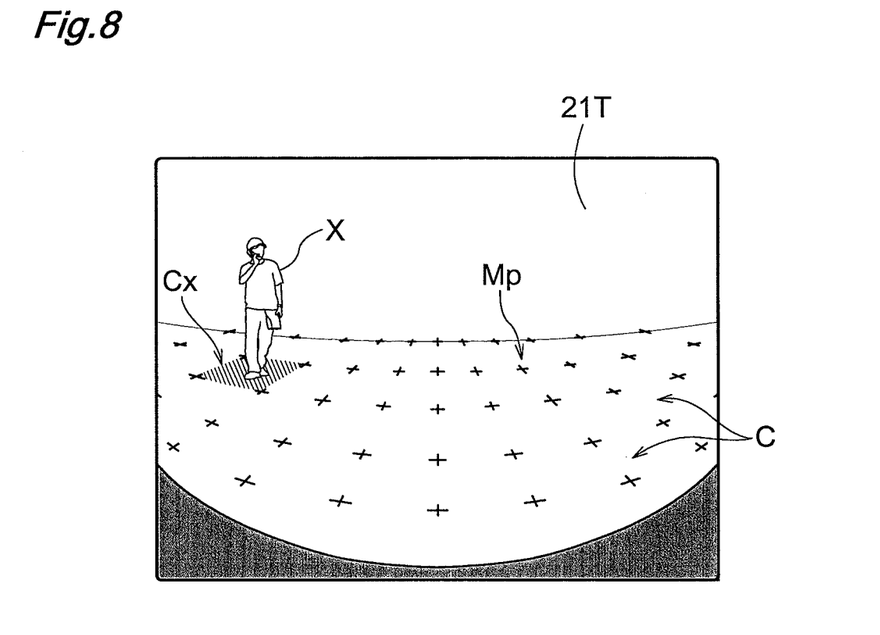
FIG. 8 is a view showing a perspective image displayed in a reticle pattern.
Figure 9:
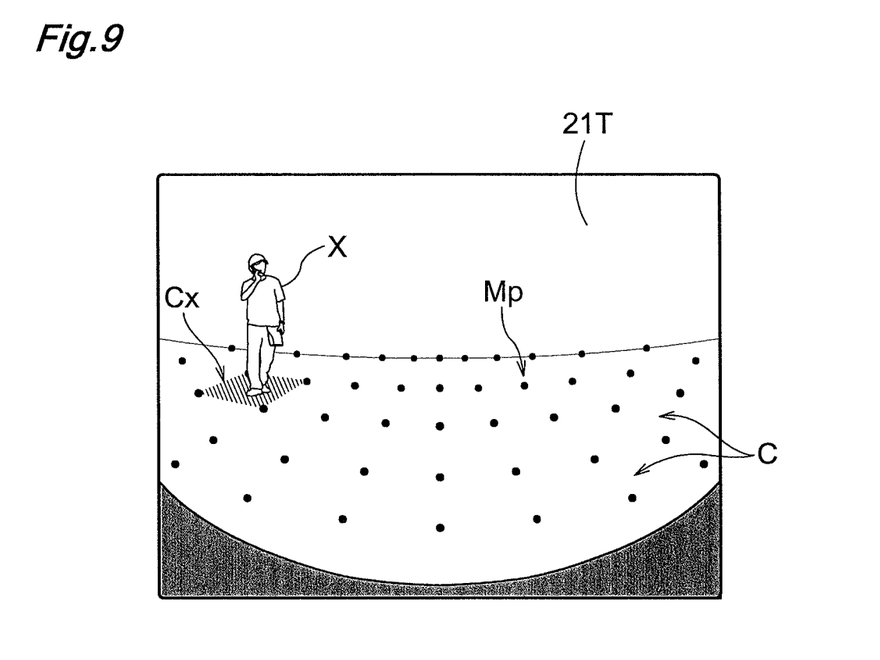
FIG. 9 is a view showing a perspective image in a dot pattern.

The image generating unit 38B generates a pattern designated from a plurality of plane measure images Mf with a designated brightness (density) and a designated hue. As such plane measure images Mf, there are set in advance a grid pattern (see FIG. 4) comprised of a plurality of vertical lines and a plurality of horizontal lines disposed equidistantly in the form of grids, a reticle pattern comprised of a plurality of reticle images arranged equidistantly in the vertical and horizontal directions as shown in FIG. 8 and a dot pattern comprised of a plurality of dots arranged equidistantly in the vertical and horizontal directions as shown in FIG. 9.

Further, the plane measure image Mf comprises a partitioning image in which the grids, reticles, or the dots thereof have a density and cellular images C partitioned by these partitioning images are formed transparently. And, the image generating unit 38B generates a designated one of these plane measure images Mf.

The cellular area designating unit 38C effects a processing for designating cellular areas C in the plane measure image Mf where a ground object X is present, based on the information from the obstacle sensor units SB and providing these cellular areas C with a characteristic coloring (higher brightness, higher luminance, a higher chroma saturation, etc.) different from the other cellular areas C (the areas where no ground object X is detected) (cellular areas Cx). The scroll processing unit 38D effects a processing for scrolling the plane measure image Mf on a virtual plane, based on the moving direction and the movement amount per unit period of the vehicle body 1.

The conversion processing unit 38E generates a perspective image Mp which is formed by projecting and converting the plane measure image Mf onto a virtual plane coinciding with the road surface, based on the view angle of the image capturing optical system (lens, optoelectronic conversion device, etc.) of the rear camera 28, distortion information of this image capturing optical system, information of the image capturing direction (camera lens information).

The synthesis processing unit 38F realizes synthesis in the form of superimposing the perspective image Mp over the captured image of the rear camera 28. More specifically, there is conceived a processing mode using a background layer in which a captured image is mapped and an image layer to be superposed thereon. And, in the road surface-fixed mode, the captured image of the rear camera 28 will be mapped relative to the background layer at a predetermined interval and also the perspective image Mp will be mapped relative to the image layer in timing synchronized therewith. Also, in the viewing field-fixed mode, the captured image of the rear camera 28 will be mapped at the set interval relative to the background layer, but the perspective image Mp mapped in the image layer will be maintained intact. Incidentally, the "set interval" refers to the interval of the time interval that the rear camera 28 outputs captured images per second.

The display mode setting unit 38A, the image generating unit 38B, the cellular area designating unit 38C, the scroll processing unit 38D, the conversion processing unit 38E and the synthesis processing unit 38F are comprised of software. Instead, however, these may be comprised of hardware alone or combination of software and hardware.

In particular, in case the conversion processing unit 38E is comprised of software, the projection conversion will be realized by computations. For instance, the relationship between the pixels of the perspective image Mp generated by the projection conversion and the coordinates of the pixels together constituting the plane measure image Mf (these may be considered as addresses) may be formulated into a table of data so as to increase the speed of the conversion processing.

The ECU 30 is comprised of an electronic circuit, which may incorporate some or all of the interfaces and the output systems. Incidentally, the ECU 30 include the electronic circuit constituting the processing system, or a storage section as a discrete component, comprised of memories, registers, etc and effects input/output of information via data buses, address busses, control buses, etc.

The sensor input interface 31 inputs driving operation information and moving condition detection information from the steering sensor S16, the shift position sensor S19, the accelerator sensor S17, the brake sensor S18 and the moving distance sensor S3.

The communication interface 32 effects communications via a communication network, with the power steering unit PS, the speed changing mechanism T, the brake device BK, and the GPS unit 41. Further, this communication interface 32 acquires information from the touch panel 21T, the left side camera 25, the right side camera 26, the front camera 27, the rear camera 28, and the obstacle sensor units SB.

The image output module 33 outputs images to the monitor 21 and the voice/sound output module 34 outputs voice/sound to the speaker 22.

[Control Configurations]

This ECU 30 realizes a navigation display processing for displaying navigation information on the monitor 21 or a parking assist display processing for displaying parking assist information on the monitor 21. Next, as a control according to the present invention, there will be explained, as an example thereof, a rear display processing for displaying an image of the rear side of the vehicle body 1.

Figure 5:
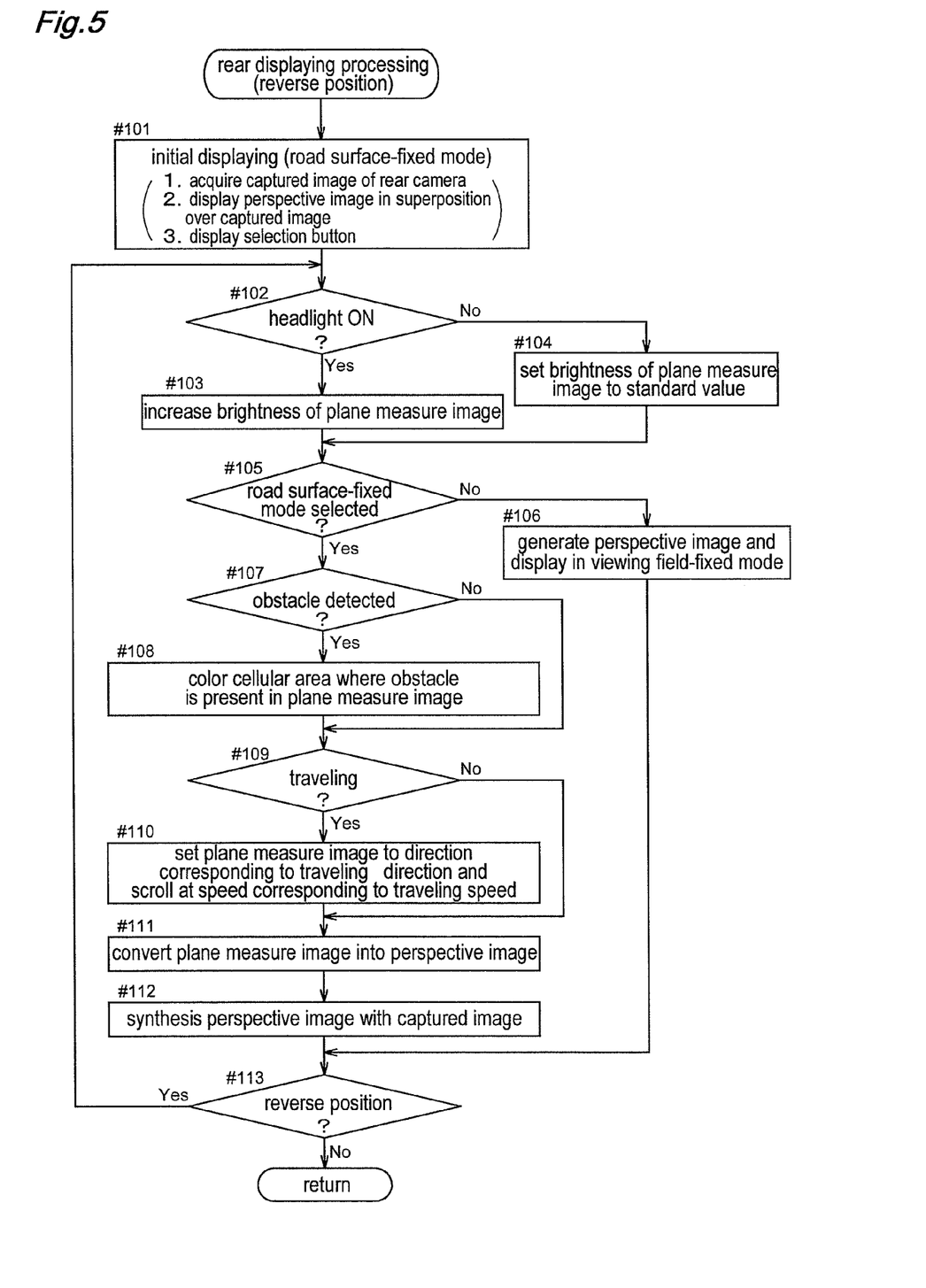
FIG. 5 is a flowchart of a rear display processing.

The rear display processing is effected automatically when the shift lever 19 is set to the reverse position and a captured image of the rear camera 28 is displayed on the monitor 21; and together with and over this displaying, the perspective image Mp is disposed in superposition on the monitor 21. With this displaying, it becomes possible to readily grasp the positional relationship between a particular portion on the road surface and the vehicle body 1 when e.g. the vehicle body 1 is to enter a parking position. This control mode will be explained next, based on the flowchart shown in FIG. 5 and the flow of information illustrated in FIG. 4.

If it is detected based on a signal from the shift position sensor S19 that the shift lever 19 has been set to the reverse (reverse traveling) position, as shown in FIG. 6, a captured image of the rear camera 28 will be displayed as the initial displaying, on the monitor 21. Also, in superposition over this captured image, a perspective image Mp will be displayed on the monitor 21 in the road surface-fixed mode. And, in the displaying position of the perspective image Mp relative to the road surface (the displaying position of the plane measure image Mf relative to the road surface, in the scroll processing unit 38D) will be stored as a reference position. Further, the monitor 21 will show a selection button 45 and a non-selection button 46 (step at #101).

In this processing, as a plane measure image Mf generated by the image generating unit 38B is converted by the conversion processing unit 38E, there is generated a perspective image Mp that reflects the sense of perspective of the captured image of the rear camera 28 and distortion of the captured image due to the image capturing optical system of the rear camera 28. Further, though not shown in the flowchart, if the non-selection button 46 is operated, no plane measure image Mf will be generated and the monitor 21 also will display no perspective image Mp, either. The processing by the cellular area designating unit 38C and the processing by the scroll processing unit 38D will be described later.

As the plane measure image Mf, one designated by the user from the grid pattern, the reticle pattern, the dot pattern, etc., will be generated by the image generating unit 38B. With desired operations by the user, the hue, the brightness (density) of the plane measure image Mf and the spacing in the vertical direction and the horizontal direction of the pattern too can be set as desired. Incidentally, in the drawing relating to this particular mode of control, a grid pattern is shown.

The conversion processing unit 38E sets a virtual plane at the road surface level of the captured image and generates, on this virtual plane by e.g. a projection conversion technique, a perspective image Mp that reflects a predetermined perspective and distortion of the lens of the rear camera 28, in the plane measure image Mf. At the time of this conversion processing, the vertical lines of the plane measure image Mf will be set to the posture parallel with the fore/aft direction of the vehicle body 1. With execution of such conversion, the perspective image Mp will be provided in the form as shown in FIG. 6. Incidentally, the perspective image Mp is in the form common to a graphics drawn by the perspective drawing method. And, the perspective image Mp will be generated in such a manner that the vanishing point in this perspective drawing method may be located rearwardly of the width-wise center of the vehicle body 1.

With such displaying of the perspective image Mp as described above, if e.g. the spacing in the fore-aft direction of the grid pattern is set to 1 M (meter), the road surface position indicated by the horizontal line of the grid pattern most adjacent the vehicle body 1 will be understood to be present at the position 1 M (meter) from the vehicle body 1.

Next, if there is an ongoing operation of illuminating the headlights 9, the brightness of the plane measure image Mf will be increased so as to enhance the brightness of the perspective image Mp. Whereas, if the headlights 9 are off, the brightness of the plane measure image Mf will be set to a standard value so as to set the brightness of the perspective image Mp to the standard value. With this processing, the brightness set for the plane measure image Mf will be reflected in the brightness of the perspective image Mp converted by the conversion processing unit 38E. And, this perspective image Mp will be displayed on the monitor 21 (steps from #102 to #104).

The above processing is a processing effected for improving the visibility, when the visibility of the perspective image Mp is poor as the road surface is under a dark condition at nighttime. This brightness setting (brightness designation) is effected by the image generating unit 38B. The brightness setting in this processing is effected based on presence/absence of illumination of the headlights 9. In this, the sunset time may be obtained from a calendar provided in the ECU 30, latitude information acquired by the GPS unit 41, and the time of the day information of the clock of the ECU 30. Then, the processing mode may be set such that switchover is effected for enhancing the brightness if it is determined that the time is after the sunset. In often times, displaying of this perspective image Mp is not required during daytime. And, even when it is found the time is during daytime hours, the ECU 30 may set non-displaying of the perspective image Mp and may set displaying thereof only at nighttime. In other words, when the image is bright, the perspective image Mp will rarely be needed. Therefore, when the brightness of the screen of the monitor 21 is high, the perspective image Mp may not be displayed and the perspective image Mp may be displayed only when the brightness of the screen is low.

Next, in case the processing in the road surface-fixed mode is not selected (the viewing field-fixed mode is selected) with the selection button 45 displayed on the monitor 21, the perspective image Mp will be displayed in superposition over the captured mage, with the perspective image Mp being fixed in the viewing field of the monitor 21 (steps at #105 and #106).

Incidentally, in the processing at step #106, the captured image of the rear camera 28 will be mapped by the set interval relative to the background layer, whereas the perspective image Mp mapped in the image layer will be maintained intact.

Conversely, if it is determined that the processing in the road surface-fixed mode was selected at step #105, (including the case of the selection being made already), when the obstacle sensor unit SB detects a ground object X (see FIG. 7), displaying will be made with setting the displaying color of the cellular area Cx where the ground object X is present to a chromatic color having a relatively high brightness (steps #105, #107, #108).

That is, when the obstacle sensor unit SB has detected a ground object X, the cellular area designating unit 38C acquires the positional information of the ground object X and sets a displaying color for the cellular area Cx corresponding to this position information. Incidentally, in case the ground object X is present across a plurality of cellular areas C or a plurality of ground objects X are present, the corresponding plurality of cellular areas Cx will be displayed with such chromatic coloring as above.

Instead of the displaying mode described above, for instance, it is also possible to increase the brightness or change the hue of the portion (the horizontal line and/or vertical line) in the perspective image Mp where the ground object X is present or to display the portion (the horizontal line and/or vertical line) with "blinking".

Next, in case it is determined that the vehicle body 1 is currently traveling, relative to the stored reference position, the plane measure image Mf will be scrolled in the direction reflecting the traveling direction of the vehicle body 1 and the steering direction (steps #109, #110) (in the direction opposite to the traveling direction of the vehicle body).

In the above processing, the scroll processing unit 38D obtains signals from the steering sensor S16 and the moving distance sensor S3, thereby to acquire the traveling direction of the vehicle body 1 and the per unit period moving distance and then scrolls the plane measure image Mf in the opposite direction to the direction of this movement.

That is, the scroll processing unit 38D scrolls the plane measure image Mf and in the course of this scrolling, perspective images Mp will be generated from the plane measure image Mf by the interval of the rear camera 28 outputting its captured images per every second. And, in case this perspective image Mp is displayed in superposition over the captured image, the displaying will be effected such that this perspective image Mp is fixed to the road surface to be movable in unison therewith.

More particularly, the plane measure image Mf will be formed in the bit map format in a predetermined area on the memory. In the case of scrolling, in this predetermined area, the plane measure image Mf will be moved in parallel by e.g. the affine transformation technique or the like (increments/decrements of the address values are to be effected). In the course of such scrolling, the set area F (see FIG. 4) of the plane measure image Mf will be extracted by the above-described interval and as will be described later, the conversion processing unit 38E converts it into the perspective image Mp. As a result, this perspective image Mp will be displayed on the monitor 21 while being scrolled in unison with the road surface.

In this processing, when the vehicle body 1 is stopped, an operation may be effected for e.g. increasing the brightness of the plane measure image Mf in order to enhance the brightness of the perspective image Mp or reduce the transparency of the plane measure image Mf in order to reduce the transparency (the degree of transparency) of the perspective image Mp (for making it more conspicuous). Also, when it is detected that the vehicle body 1 is moving, an operation may be effected for decreasing the brightness of the plane measure image Mf in order to reduce the brightness of the perspective image Mp or increase the transparency of the plane measure image Mf in order to increase the transparency of the perspective image Mp (for making it less conspicuous). With such processing as above, the brightness or transparency set for the plane measure image Mf will be reflected in the brightness or transparency of the perspective image Mp converted by the conversion processing unit 38E and this perspective image Mp will be displayed on the monitor 21. With effecting of such processing, at the time of stopping of the vehicle, the perspective image Mp will be rendered more conspicuously visible, for allowing grasping of the positional relationship between the road surface and the vehicle body. At the time of moving/traveling of the vehicle body 1, the visibility of the perspective image Mp will be lowered so as not to interfere with the grasping of the captured image being displayed on the monitor 21. In the above description, the language "increasing the transparency" may be changed to a language "making it semi-transparent with higher transparency".

Conversely, at the time of stopping of the vehicle body 1, a similar processing to the one above may be effected for reducing the brightness of the perspective image Mp and enhancing the transparency of the perspective image Mp (rendering it less conspicuous). With effecting of such processing, at the time of stopping of the vehicle body 1, the perspective image Mp will not be obstructive to the view and the visibility at the time of movement/traveling of the vehicle body 1 may be enhanced.

Next, in the conversion processing unit 38E, the plane measure image Mf will be converted into the perspective image Mp by the interval of the rear camera 28 outputting a captured image. In this conversion processing unit 38E, in the plane measure image Mf, the above-described information of the area F set therein will be converted into an image having the perspective with the projection conversion on the virtual plane coincident with the road surface. And, after this, the image will be converted into an image reflecting the viewing angle of the image capturing optical system of the rear camera 28, the distortion information thereof, etc. In this way, there is generated a perspective image Mp providing the perspective and reflecting the distortion of the image capturing optical system. Incidentally, high speed conversion may be made possible by effecting the conversion with using the table data described above.

And, the synthesis processing unit 38F synthesizes the perspective image Mp as being superimposed over the captured image and this is provided to the image outputting module 33. And, this synthesized image will be displayed on the monitor 21. This processing will be effected in continuation until the shift lever 19 is set to a position other than the reverse position (steps #111 through #113).

In particular, at the step #112 (road surface-fixed mode), the synthesis processing unit 38F maps the captured image of the rear camera 28 by the set interval relative to the background layer as described above and the perspective image will be mapped by the timing synchronized therewith relative to the image layer.

As described above, according to the present invention, when the shift lever 19 is set to the reverse position, the monitor 21 displays a captured image captured by the rear camera 28 and displays also a perspective image Mp in superposition over this captured image. And, the displaying position of the perspective image Mp relative to the road surface (the displaying position of the plane measure image Mf relative to the road surface in the scroll processing unit 38D) will be stored as the reference position. As the perspective image Mp reflects the perspective of the captured image of the rear camera 28 as well as the distortion of the rear camera 28, it is possible to grasp the distance to a line indicating a parking position or an obstacle present on the road surface or the like with using the perspective image Mp as the reference.

Under the initial condition of the shift lever 19 being set to the reverse position, the processing in the road surface-fixed mode has been selected. Hence, in association with movement of the vehicle body 1, scrolling of the perspective image Mp will be effected, with using the stored displaying position of the perspective image Mp relative to the road surface as the reference. Hence, even if a steering operation is effected, the perspective image Mp will be displayed while being moved (scrolled) in unison with the road surface in the captured image. Accordingly, there will occur no change in the relative positional relationship between the road surface and the perspective image Mp, and there will occur no unnaturalness in the displaying of the perspective image Mp. Consequently, grasping of the movement amount and moving speed will be facilitated even in the course of traveling on a road surface with less shading.

Further, in case the viewing field-fixed mode is selected, there is provided a mode of displaying in which the perspective image Mp is not moved in the displaying area of the monitor 21 even during movement of the vehicle body 1, so that from the vehicle body 1 and based on the perspective image Mp, the distance to a line indicating a parking position or an obstacle present on the road surface can be grasped.

Other Embodiments

The present invention may be configured as follows, in addition to the foregoing embodiment.

Figure 10:
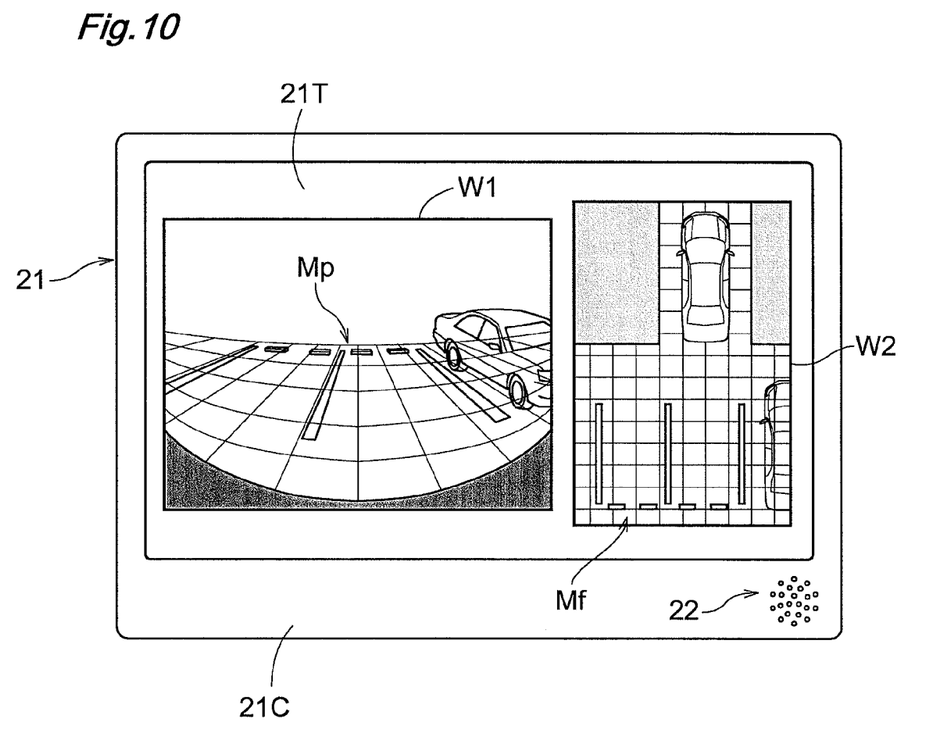
FIG. 10 is a view showing a displaying mode of a monitor according to a further embodiment (a)

(a) As shown in FIG. 10, there may be formed on the monitor 21, a first window W1 for displaying a perspective image Mp in superposition over a captured image of the rear camera 28 and a second window W2 for displaying a bird's eye view showing the vehicle body 1 as seen from the above. In displaying a bird's eye view in the second window W2 as above, the plane measure image Mf may be displayed in an image rearwardly of the vehicle body 1. With this displaying of the plane measure image Mf in the bird's eye view, the condition rearwardly of the vehicle body 1 can be grasped more favorably.

Figure 11:
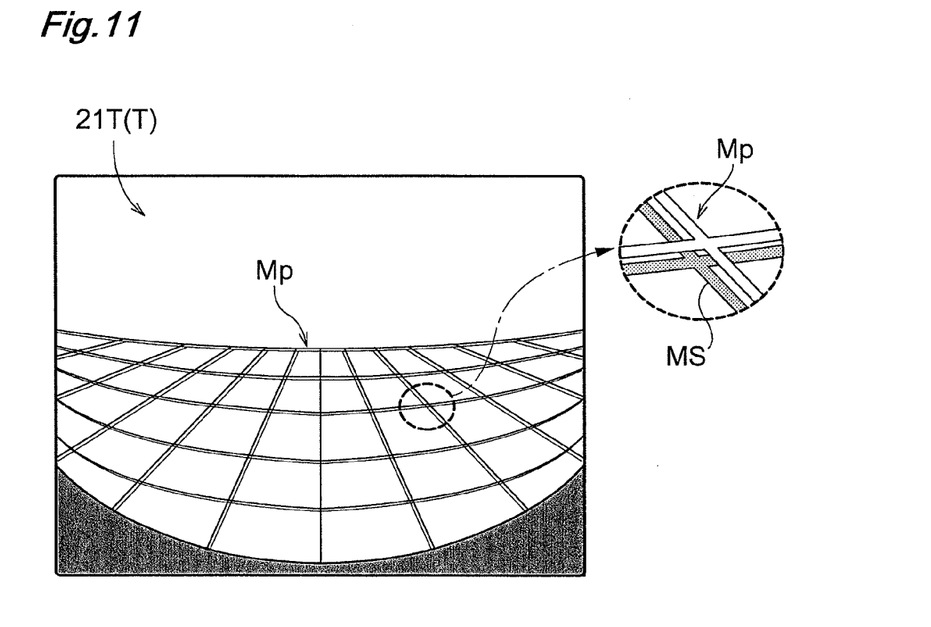
FIG. 11 is a view showing a displaying mode of a monitor according to a further embodiment (b).

(b) For instance, in case the grid pattern is displayed as the perspective image Mp, as shown in FIG. 11, this grid pattern may be displayed at a position slightly higher than the road surface, and a shade Ms may be displayed on the road surface. Further alternatively, the grid pattern may be provided with a "thickness" in the height direction, so that this grid pattern may be displayed in a three-dimensional manner. With such three-dimensional displaying, the position of the perspective image Mp will be made clearer, so that the distance between a particular position on the road surface and the vehicle body may be readily made from the perspective image Mp.

(c) The processing mode may be configured such that the perspective image Mp is displayed on the monitor 21 also in the parking assist mode for guiding the vehicle body 1 by reversing it to a parking position. In this parking assist mode, for guiding the vehicle body 1 to the parking position, the monitor 21 will display image information for indicating the parking position, image information of an expected traveling route in reversing the vehicle body 1, etc. Then, as the perspective image Mp is displayed on the monitor 21 together with these information, the moving of the vehicle body 1 at the time of parking may be further facilitated.

(d) In the case of advancing the vehicle body 1 too, the perspective image Mp may be displayed on the monitor 21 in superposition over the captured image of the front camera 27. With setting of the processing mode in this way, the relative position between the vehicle body 1 and a crossing point or the distance between the self vehicle and another vehicle present ahead may be readily grasped.

(e) In the case of synthesis by superposing the perspective image Mp over a captured image, the processing mode may be configured such that if a ground object is detected by the obstacle sensor unit SB, the perspective image Mp in the area where this ground object is present will be prevented from being displayed by e.g. the shading technique. With such setting of processing mode, e.g. the shape of the ground object can be clearly grasped without being blocked by the perspective image Mp.

(f) The processing mode may be configured such that upon the timing of establishment of a predetermined condition in the viewing field-fixed mode while the vehicle body 1 is being moved or in response to a predetermined manual input operation, the mode is switched over to the road surface-fixed mode as being triggered thereby and the relationship between the displaying position of the perspective image Mp and the road surface at the timing of the switchover is stored as the reference position. As described above, this storing will be effected as an operation of storing the displaying position of the plane measure image Mf relative to the road surface as a reference position in the scroll processing unit 38D.

As some specific examples thereof, it is conceivable to issue the above trigger (1) when the vehicle body 1 is moved in the viewing field-fixed mode and an obstacle (ground object X) is detected or (2) when a parking space delimiting box frame is recognized in a processing of white line recognition or the like, or (3) when a driver operates a predetermined switch (a switch other than the selection button 45). Further, as variations of these (1) through (3), the triggering by (1) to (3) may be issued based on the condition of the shift lever 19 being set to the reverse (reverse traveling) position.

With the above-described configuration that the switchover from the viewing field-fixed mode to the road surface-fixed mode is triggered in response to establishment of a predetermined condition or a manual operation, it becomes possible to cause e.g. the vehicle body 1 to be moved in the viewing field-fixed mode and to automatically shift to the road surface-fixed mode upon establishment of a predetermined condition or to allow the driver to consciously align a predetermined grid of the perspective image Mp with e.g. a road surface sign mark.

Further, at the time of the road surface-fixed mode, (1) when an obstacle (ground object X) is detected or (2) when a parking space delimiting box frame is recognized by a processing such as white line recognition or (3) when the driver operates a predetermined switch (a switch other than the selection button 45), the perspective image Mp may be returned to the initial state.

Specifically, when the shift lever 19 is set to the reverse (reverse traveling) position, the perspective image Mp will be displayed in superposition over the image captured at this timing and the displaying position of this perspective image Mp relative to the road surface will be stored as the reference position and displayed. Thereafter, when the vehicle body 1 is moved in the road surface-fixed mode, the perspective image Mp will be moved together with the captured image. Under such circumstance, when the driver operates a predetermined switch (a switch other than the selection button 45), after the same operation as that effected when the shift lever 19 is set to the reverse (reverse traveling) position in the road surface-fixed mode is effected, the perspective image Mp may be displayed again (the perspective image Mp is reset) for facilitating the driver's recognition.

INDUSTRIAL APPLICABILITY

The present invention is applicable to vehicles in general having a vehicle body mounting a camera for capturing an image of vicinity of the vehicle body.

DESCRIPTION OF REFERENCE MARKS/NUMERALS

1 vehicle body
21 monitor
28 camera (rear camera)
38 image processing section
38A display mode setting unit
38E conversion processing unit
38C area designating unit (cellular area designating unit)
45 selection button
C area (cellular area)
SB obstacle sensor unit
X ground object

The invention claimed is:

1. An image display device comprising:
a camera mounted on a vehicle body for capturing an image of the surrounding of the vehicle body;
a non-transitory computer readable recording medium containing software; and
an image processor for executing the software to cause the captured image of the camera to be displayed on a monitor mounted on the vehicle body,
to generate a perspective image which is a computer-generated grid graphic that reflects the perspective of the captured image of the camera, and
to execute a processing in a road surface-fixed mode in which
the perspective image is overlaid on the captured image, is stationary with respect to the road surface in the captured image, and is displayed in a non-fixed manner when the vehicle body moves so as to be scrolled in association with a movement of the vehicle body and this scrolled perspective image is displayed in superposition over the captured image on the monitor,
wherein the image processor generates a plane measure image including a partitioning image which partitions a virtual plane corresponding to the road surface in the horizontal direction and the vertical direction by a predetermined interval and converts this plane measure image into the perspective image that reflects the perceived perspective of the captured image of the camera.

2. The image display device according to claim 1, wherein there is set a processing in a viewing field-fixed mode for displaying on the monitor the perspective image in superposition with the perspective image being fixed within a displaying area of the monitor and the image processor selectively effects one of the road surface-fixed mode and the viewing field-fixed mode.

3. The image display device according to claim 2, wherein there is provided a selection button for selecting, with an operation, one of the processing in the road surface-fixed mode and the processing in the viewing field-fixed mode.

4. The image display device according to claim 1, wherein the image processor executes the software stored in the non-transitory computer readable recording medium to further change the mode of displaying of an area where a ground object is present in the perspective image to a mode different from that of an area where no ground object is detected, in case the ground object is detected by an obstacle sensor in the road surface-fixed mode.

5. The image display device according to claim 1, wherein the image processor is configured to display the perspective image on the monitor only at nighttime.

6. The image display device according to claim 1, wherein the image processor sets higher transparency for the perspective image at the time of moving of the vehicle body than at the time of stopped state of the vehicle body.

7. The image display device according to claim 1, wherein the image processor sets higher brightness for the perspective image at nighttime as compared with daytime.

8. The image display device according to claim 1, wherein the image processor progressively lowers the visibility for an area in the perspective image which area is farther from the vehicle body.

* * * * *